(12) United States Patent
Ahn et al.

(10) Patent No.: US 9,929,442 B2
(45) Date of Patent: Mar. 27, 2018

(54) BATTERY PACK HAVING PCM CASE

(71) Applicant: LG CHEM, LTD., Seoul (KR)

(72) Inventors: Soo Jun Ahn, Daejeon (KR); Ho Chol Nam, Daejeon (KR); Hyung Ku Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 223 days.

(21) Appl. No.: 15/024,889

(22) PCT Filed: Sep. 22, 2014

(86) PCT No.: PCT/KR2014/008768
§ 371 (c)(1),
(2) Date: Mar. 25, 2016

(87) PCT Pub. No.: WO2015/046832
PCT Pub. Date: Apr. 2, 2015

(65) Prior Publication Data
US 2016/0240892 A1 Aug. 18, 2016

(30) Foreign Application Priority Data
Sep. 30, 2013 (KR) .......................... 10-2013-0116472

(51) Int. Cl.
*H01M 2/26* (2006.01)
*H01M 10/42* (2006.01)
(Continued)

(52) U.S. Cl.
CPC ......... *H01M 10/425* (2013.01); *H01M 2/021* (2013.01); *H01M 2/0212* (2013.01);
(Continued)

(58) Field of Classification Search
CPC ....................................................... H01M 2/26
See application file for complete search history.

(56) References Cited

U.S. PATENT DOCUMENTS

| 2006/0115723 A1 | 6/2006 | Ando et al. |
| 2008/0096101 A1 | 4/2008 | Kwag et al. |
| (Continued) | | |

FOREIGN PATENT DOCUMENTS

| CN | 1732579 A | 2/2006 |
| CN | 101926021 A | 12/2010 |
| (Continued) | | |

OTHER PUBLICATIONS

International Search Report for PCT/KR2014/008768 dated Dec. 16, 2014.

*Primary Examiner* — Jacob Marks
(74) *Attorney, Agent, or Firm* — Birch, Stewart, Kolasch & Birch, LLP

(57) ABSTRACT

Disclosed herein is a battery pack configured to have a structure in which a protection circuit module (PCM) is mounted at a sealed surplus part of a battery cell at which electrode terminals of the battery cell are located, wherein the PCM includes a protection circuit board (PCB), a safety element, and an electrically insulative module case for surrounding the PCB and the safety element, the module case includes an upper case and a lower case coupled to each other through an assembly type fastening structure for receiving the PCB and the safety element, the module case, the PCB, and the electrode terminals are provided with first openings and second openings having a sufficient size to allow a first joint fastening member and a second joint fastening member to extend therethrough, and the PCB is received between the upper case and the lower case such that the PCB is electrically connected to the electrode terminals of the battery cell in a state in which the PCB is coupled to the electrode terminals of the battery cell by the first joint fastening member and the second joint fastening member.

22 Claims, 5 Drawing Sheets

(51) Int. Cl.
*H01M 2/02* (2006.01)
*H01M 2/06* (2006.01)
*H01M 2/30* (2006.01)
*H01M 10/04* (2006.01)
*H01M 10/0525* (2010.01)
*H01M 10/48* (2006.01)

(52) U.S. Cl.
CPC ............. *H01M 2/06* (2013.01); *H01M 2/30* (2013.01); *H01M 10/0436* (2013.01); *H01M 10/0525* (2013.01); *H01M 10/4235* (2013.01); *H01M 10/486* (2013.01); *H01M 2010/4271* (2013.01); *H01M 2220/30* (2013.01)

(56) References Cited

U.S. PATENT DOCUMENTS

| | | |
|---|---|---|
| 2009/0311581 A1 | 12/2009 | Park et al. |
| 2010/0009251 A1 | 1/2010 | Shin et al. |
| 2011/0086262 A1 | 4/2011 | Kim et al. |
| 2011/0135971 A1 | 6/2011 | Ahn |
| 2012/0171556 A1 | 7/2012 | Kim et al. |
| 2012/0295153 A1 | 11/2012 | Byun |
| 2013/0040170 A1 | 2/2013 | Choi et al. |
| 2013/0084472 A1* | 4/2013 | Choi ............... H01M 2/0404 429/7 |
| 2014/0147706 A1 | 5/2014 | Choi et al. |
| 2014/0147707 A1 | 5/2014 | Choi et al. |

FOREIGN PATENT DOCUMENTS

| | | |
|---|---|---|
| CN | 103227304 A | 7/2013 |
| EP | 2 744 017 A2 | 6/2014 |
| JP | 11-31486 A | 2/1999 |
| JP | 2000-251868 A | 9/2000 |
| JP | 2001-93496 A | 4/2001 |
| JP | 2002-50337 A | 2/2002 |
| JP | 2006-302662 A | 11/2006 |
| JP | 2011-86623 A | 4/2011 |
| JP | 2012-506109 A | 3/2012 |
| JP | 2013-38065 A | 2/2013 |
| KR | 10-0770106 B1 | 10/2007 |
| KR | 10-1227870 B1 | 1/2013 |
| WO | WO 2009/066953 A2 | 5/2009 |
| WO | WO 2013/022211 A2 | 2/2013 |

* cited by examiner

[FIG. 1]
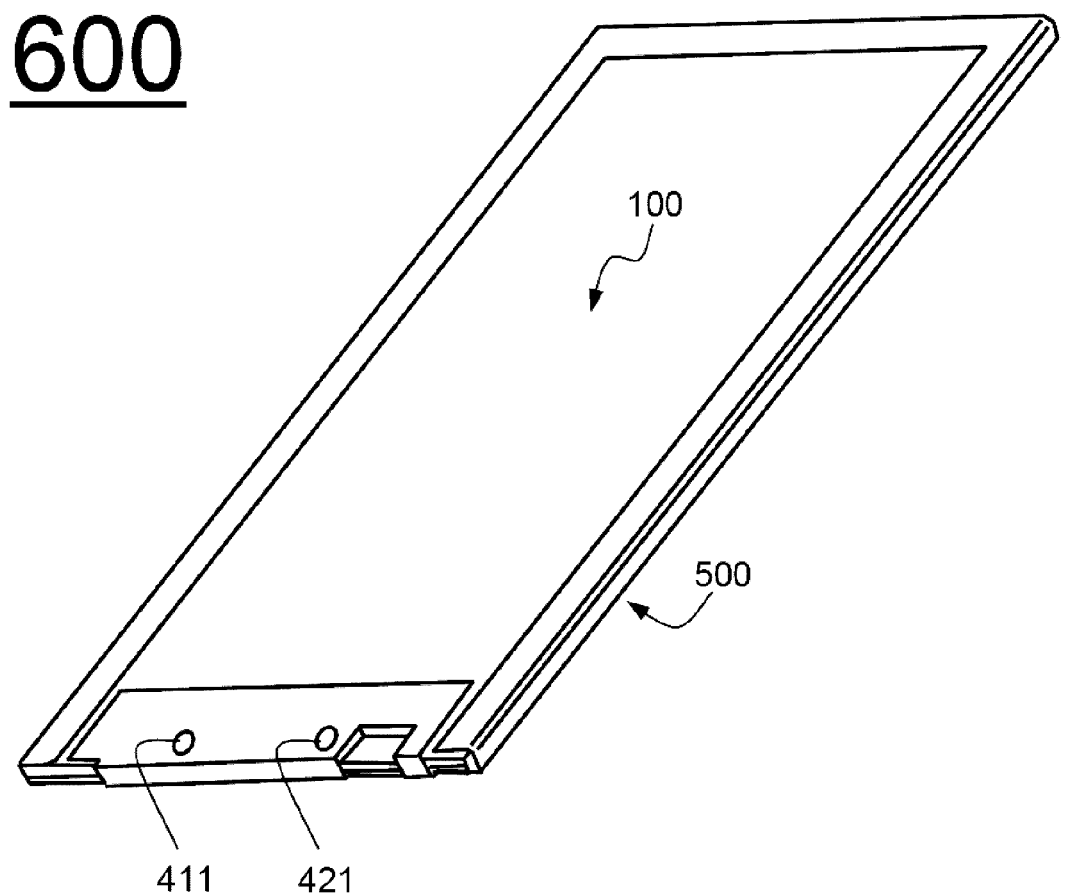

[FIG. 2]
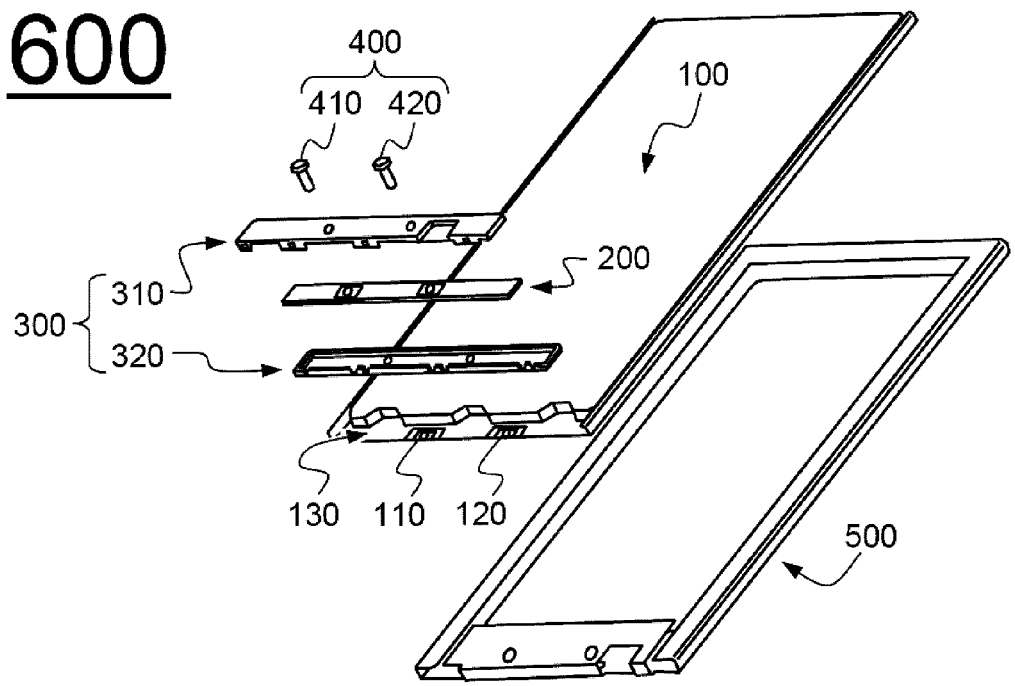

[FIG. 3]
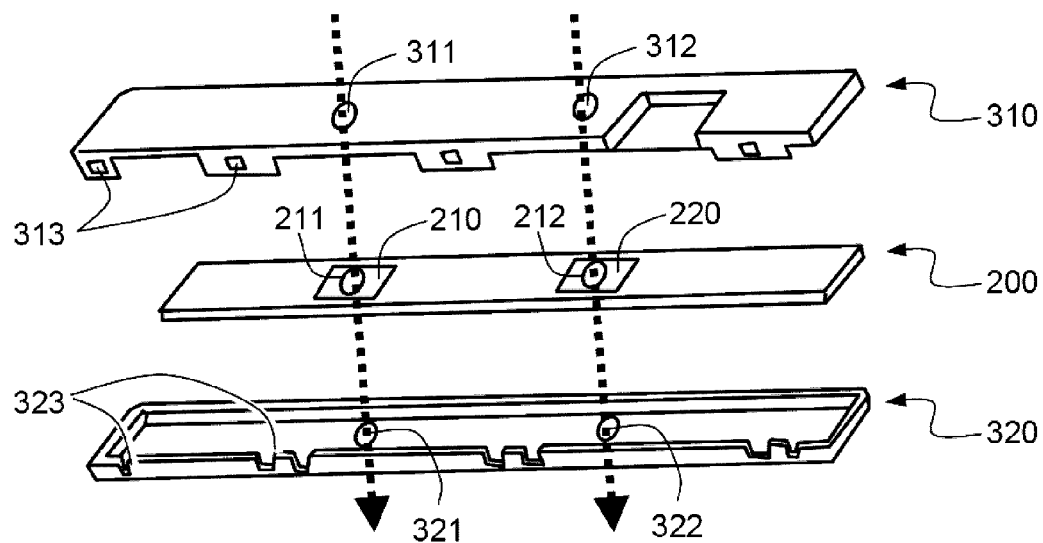
[FIG. 4]
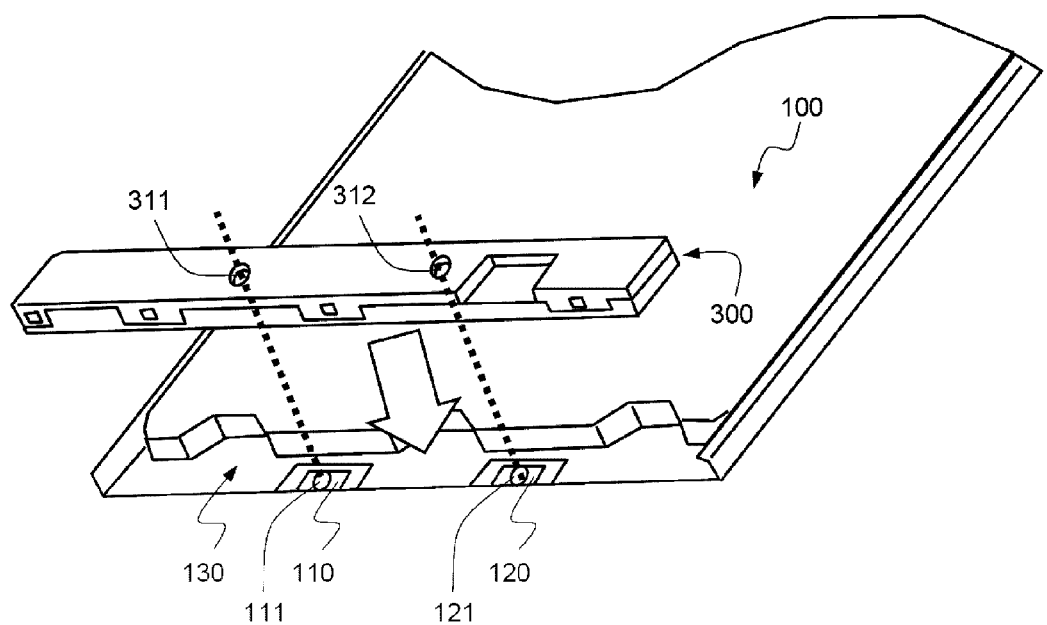

[FIG. 5]
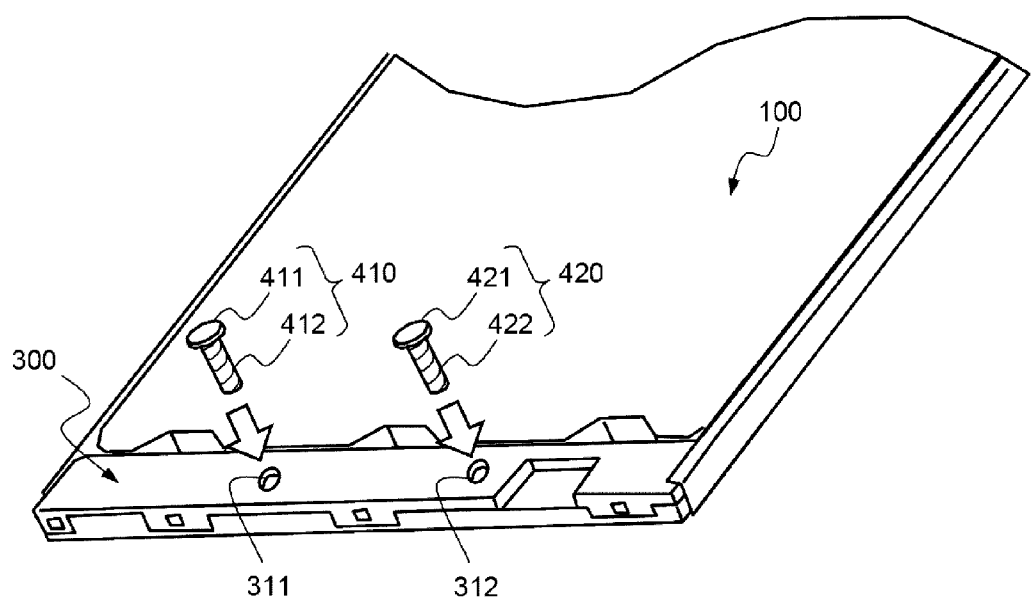

[FIG. 6]
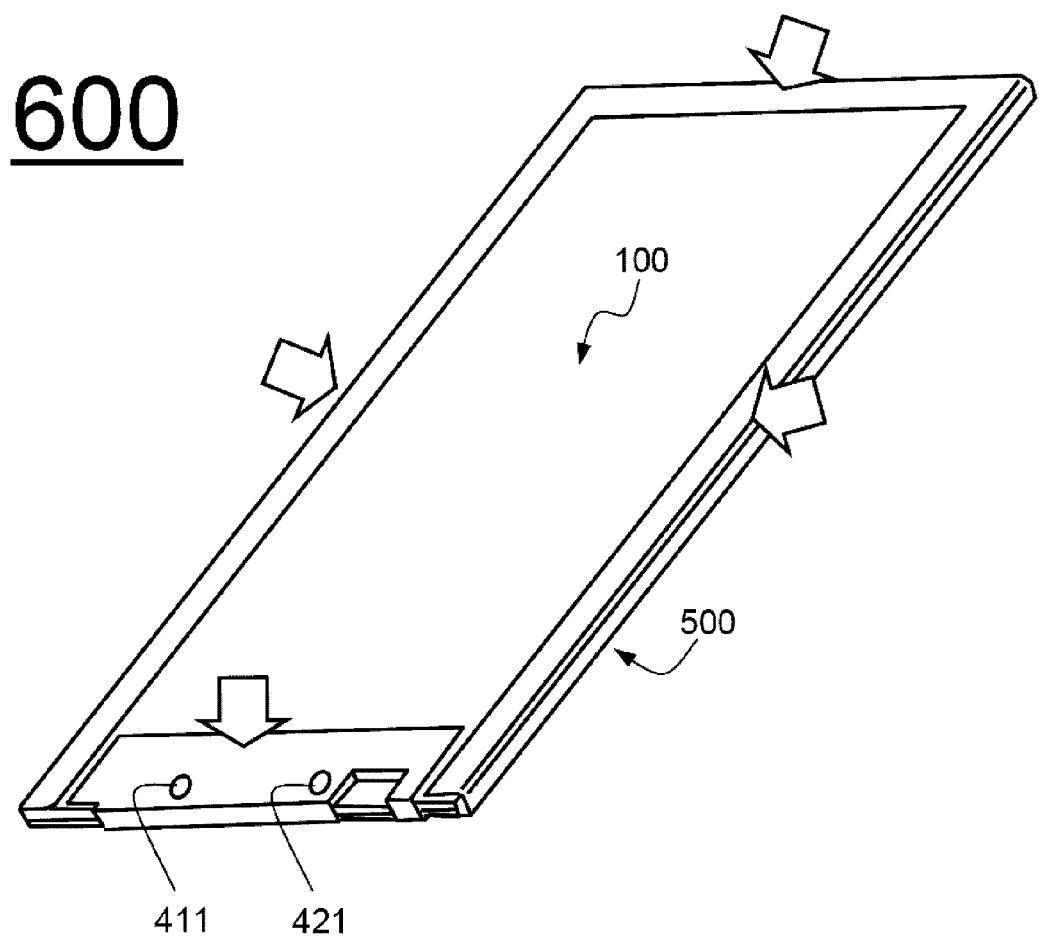

BATTERY PACK HAVING PCM CASE

TECHNICAL FIELD

The present invention relates to a battery pack including a protection circuit module (PCM) case and, more particularly, to a battery pack configured to have a structure including a plate-shaped battery cell including a sealed surplus part and a protection circuit module (PCM) mounted at the sealed surplus part, wherein the PCM includes a protection circuit board (PCB), a safety element, and an electrically insulative module case, the module case includes an upper case and a lower case coupled to each other through an assembly type fastening structure for receiving the PCB and the safety element, the module case, the PCB, and the electrode terminals are provided with first openings and second openings having a sufficient size to allow a first joint fastening member and a second joint fastening member to extend therethrough, and the PCB is loaded on the sealed surplus part of the battery cell in a state in which the PCB is received between the upper case and the lower case such that the PCB is electrically connected to the electrode terminals of the battery cell in a state in which the PCB is coupled to the electrode terminals of the battery cell by the first joint fastening member and the second joint fastening member.

BACKGROUND ART

A secondary battery represented by a lithium secondary battery exhibiting high energy density and operating voltage and excellent charge retention and service-life characteristics has been widely used as an energy source for various electronic products as well as various mobile devices.

Depending upon the kind of an external device in which a secondary battery is used, the secondary battery may be configured to have a detachable type structure in which the secondary battery can be easily inserted into and removed from the external device or to have an embedded type structure in which the secondary battery is embedded in the external device. For example, the secondary battery can be inserted or removed into or from devices, such as laptop computers, as needed. On the other hand, devices, such as some kinds of smart phones and smart pads, require an embedded type battery pack due to the structure or capacity thereof.

Meanwhile, various kinds of combustible materials are contained in the lithium secondary battery. As a result, the lithium secondary battery may be heated or explode due to the overcharge of the lithium secondary battery, the overcurrent in the lithium secondary battery, or other external physical impact applied to the lithium secondary battery. That is, the safety of the lithium secondary battery is very low. For this reason, safety elements, such as a positive temperature coefficient (PTC) element and a protection circuit module (PCM), which are capable of effectively controlling an abnormal state of the lithium secondary battery, such as the overcharge of the lithium secondary battery or the overcurrent in the lithium secondary battery, are connected to a battery cell of the lithium secondary battery.

In general, an embedded type secondary battery pack uses a plate-shaped battery cell, which is suitable for electrical connection, and a PCM is connected to the battery cell via conductive nickel plates by welding or soldering. That is, the nickel plates are connected to electrode terminals of the battery cell by welding or soldering, a flexible printed circuit board (F-PCB) is attached to one side of a double-sided adhesive tape, a protective tape is attached to the other side of the double-sided adhesive tape, and electrode tabs of the F-PCB and the nickel plates are connected to each other by welding in a state in which the F-PCB is in tight contact with the battery cell. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell.

To this end, insulative tapes are attached to various members, including the PCM. In addition, a portion of a sealed part of a battery case, in which the battery cell is received, is bent, and an insulative tape is attached thereto or a barcode is printed thereon. That is, the process is very complicated.

Since a plurality of insulative tapes or parts is required to achieve safe connection as described above, a battery pack assembly process is complicated and manufacturing cost of the battery pack is increased.

In addition, when external impact is applied to the battery pack, the PCM may be damaged or dimensional stability of the battery pack may be greatly lowered due to the use of the insulative tapes, which exhibit low mechanical strength.

Therefore, there is a high necessity for a technology that is capable of reducing the number of members mounted to the battery cell to simplify an assembly process, achieving stable coupling between members loaded on the battery cell, and protecting the PCM.

DISCLOSURE

Technical Problem

Therefore, the present invention has been made to solve the above problems, and other technical problems that have yet to be resolved.

Specifically, it is an object of the present invention to provide a battery pack wherein the number of parts necessary to manufacture the battery pack is reduced, thereby simplifying an assembly process, and structural stability of the battery pack is improved.

It is another object of the present invention to provide a battery pack including a module case having a specific structure configured to provide higher electric capacity than other different battery packs having the same standard while having a compact structure.

Technical Solution

In accordance with one aspect of the present invention, the above and other objects can be accomplished by the provision of a battery pack configured to have a structure including a plate-shaped battery cell, which has an electrode assembly, configured to have a structure in which a separator is disposed between a cathode and an anode, received in a battery case together with an electrolyte in a sealed state and electrode terminals formed at one side thereof including a sealed surplus part, and a protection circuit module (PCM) mounted at the sealed surplus part, wherein each of the electrode terminals of the battery cell is made of a plate-shaped conductive member, the PCM includes a protection circuit board (PCB), a safety element electrically connected between the electrode terminals formed at one side of the battery cell and the PCB or loaded on the PCB, and an electrically insulative module case for surrounding the PCB and the safety element, the module case includes an upper case and a lower case coupled to each other through an assembly type fastening structure for receiving the PCB and the safety element, the module case, the PCB, and the electrode terminals are provided with first openings and second openings having a sufficient size to allow a first joint fastening member and a second joint fastening member to extend therethrough, and the PCB is loaded on the sealed surplus part of the battery cell in a state in which the PCB is received between the upper case and the lower case such that the PCB is electrically connected to the electrode terminals of the battery cell in a state in which the PCB is coupled to the electrode terminals of the battery cell by the first joint fastening member and the second joint fastening member.

In the battery pack according to the present invention, the protection circuit module case including the upper case, the lower case, the first openings, and the second openings is applied to the battery pack. Consequently, it is possible to reduce the number of parts constituting the battery pack and to simplify the coupling structure of the battery pack, thereby improving manufacturing processability and stability of the battery pack.

In addition, in the battery pack according to the present invention, the module case having the specific structure as described above is applied to the battery pack. Consequently, it is possible to provide higher electric capacity than other different battery packs having the same standard while having a compact structure.

In a concrete example, the plate-shaped battery cell may be provided at one side or opposite sides of the sealed surplus part thereof with an opening, through which the electrode terminals are exposed. The outermost ends of the electrode terminals may have a size corresponding to an outer circumference of the sealed surplus part. In addition, the opening may be formed by cutting the sealed surplus part.

In another concrete example, the plate-shaped battery cell may be configured to have a structure in which the electrode terminals extend outward from one side thereof including the sealed surplus part.

For example, the plate-shaped battery cell may be a pouch-shaped secondary battery.

Specifically, the pouch-shaped secondary battery may be configured to have a structure in which an electrode assembly is received in a battery case made of a laminate sheet including a resin layer and a metal layer in a sealed state. The electrode assembly may be configured to have a structure including a cathode, an anode, and a separator disposed between the cathode and the anode. The electrode assembly may be received in the battery case together with an electrolyte in a sealed state.

The secondary battery may be a lithium secondary battery exhibiting high energy density, discharge voltage, and output stability. Other components of the lithium secondary battery will hereinafter be described in detail.

In general, the lithium secondary battery includes a cathode, an anode, a separator, and a non-aqueous electrolytic solution containing lithium salt.

The cathode may be manufactured, for example, by applying a mixture of a cathode active material, a conductive material, and a binder to a cathode current collector and drying the applied mixture. A filler may be further added as needed. On the other hand, the anode may be manufactured by applying an anode material to an anode current collector and drying the applied anode material. The above-mentioned ingredients may be further included as needed.

The separator is disposed between the anode and the cathode. The separator may be made of an insulative thin film exhibiting high ion permeability and mechanical strength.

The non-aqueous electrolytic solution containing lithium salt consists of a non-aqueous electrolyte and lithium salt. A liquid non-aqueous electrolytic solution, a solid electrolyte, or an inorganic solid electrolyte may be used as the non-aqueous electrolyte.

The current collectors, the electrode active materials, the conductive material, the binder, the filler, the separator, the electrolytic solution, and the lithium salt are well known in the art to which the present invention pertains and, therefore, a detailed description thereof will be omitted.

The lithium secondary battery may be manufactured using an ordinary method well known in the art to which the present invention pertains. For example, the lithium secondary battery may be manufactured by disposing a porous separator between a cathode and an anode and injecting an electrolytic solution thereinto.

The cathode may be manufactured, for example, by applying a slurry containing a lithium transition metal oxide active material, a conductive material, and a binder to a current collector and drying the applied slurry. In the same manner, the anode may be manufactured, for example, by applying a slurry containing a carbon active material, a conductive material, and a binder to a thin current collector and drying the applied slurry.

In the present invention, the sealed surplus part means an upper end sealed part formed when the battery case is thermally bonded in a sealed state.

Specifically, a sealed part having a surplus space formed at one of the sealed outer circumferences of the battery case formed when the electrode assembly is disposed in the battery case made of the laminate sheet in a sealed state is referred to as a sealed surplus part. However, the sealed surplus part may be replaced by terms, such as a thermally bonded surplus part and a sealed terrace, as long as the specified terms have the same meaning as the sealed surplus part.

In a concrete example, the safety element may be an element that is capable of effectively controlling an abnormal state of the anode and cathode terminals electrically connected to a device in which the battery pack is mounted and an abnormal state of the battery pack, such as the overcharge of the battery pack or the overcurrent in the battery pack. Examples of the safety element may include a positive temperature coefficient (PTC) element, a fuse, and a thermal cutoff or cutout (TCO).

In another concrete example, the assembly type fastening structure may include two or more fastening protrusions formed at one side of the lower case and two or more fastening grooves formed at the upper case in a state in which each of the fastening grooves has a structure corresponding to a structure of a corresponding one of the fastening protrusions.

In addition, the first joint fastening member may extend through the first openings, the second joint fastening member may extend through the second openings, and the first openings and the second openings formed at the module case, the PCB, and the electrode terminals each may be aligned in a straight line such that the first joint fastening member and the second joint fastening member extend through the first openings and the second openings formed at the module case, the PCB, and the electrode terminals, respectively, in the straight line.

The first joint fastening member and the second joint fastening member each may be made of an electrically conductive material. In this case, bolt heads of the first joint fastening member and the second joint fastening member may function as external input and output terminals after the first joint fastening member and the second joint fastening member are fixed to the module case, the PCB, and the electrode terminals by bolting.

In addition, the first joint fastening member and the second joint fastening member each may be configured to have a bolt structure including a bolt head and a bolt body having a thread formed at an outside thereof for fixing the module case, the PCB, and the electrode terminals by bolting. Consequently, the first joint fastening member and the second joint fastening member with the above-stated construction may fix even a mount part of a device, in which the battery pack is mounted, by bolting, thereby achieving a stable mounting effect of the battery pack.

The module case with the above-stated construction includes the upper case and the lower case each configured to have a specific structure. Consequently, it is possible to easily receive and fix the PCB and the safety element in the module case. In addition, the module case is configured to have a structure which does not require an additional fixing member or protection member. Consequently, productivity is improved through a simplified assembly process. Furthermore, the PCB and the safety element are securely and stably fixed by the first joint fastening member and the second joint fastening member in a state in which the PCB and the safety element are received in the module case such that the PCB and the safety element can be protected from the outside. Consequently, it is possible to improve overall mechanical strength of the PCM.

In addition, the module case, in which the PCB and the safety element are received, may be a rectangular hexahedral structure having a smooth outer surface. Consequently, the module case may be easily loaded on the sealed surplus part of the battery cell.

As a result, the battery pack according to the embodiment of the present invention has a more compact structure than a conventional battery pack. In addition, it is possible to utilize a space occupied by a PCM, a PCM fixing member, or PCM protection members of the conventional battery pack as a space for electrical capacity. Consequently, it is possible to increase electrical capacity of the battery pack.

In a concrete example, the battery pack may further include a label attached to outer surfaces of the PCM and the battery cell excluding the external input and output terminals in a wrapping fashion. Consequently, it is possible to more stably secure electrical connection between the electrode terminals of the battery cell and the PCB while maintaining insulation of the battery cell.

In accordance with another aspect of the present invention, there is provided a protection circuit module (PCM), having a specific structure, which is used to constitute the battery pack with the above-stated construction.

Specifically, there is provided a PCM loaded on a sealed surplus part of a plate-shaped battery cell having an electrode assembly, configured to have a structure in which a separator is disposed between a cathode and an anode, received in a battery case together with an electrolyte in a sealed state, wherein the PCM includes a PCB, a safety element electrically connected between electrode terminals formed at one side of the battery cell and the PCB or loaded on the PCB, and an electrically insulative module case for surrounding the PCB and the safety element, the module case includes an upper case and a lower case coupled to each other through an assembly type fastening structure for receiving the PCB and the safety element, the module case, the PCB, and the electrode terminals are provided with first openings and second openings having a sufficient size to allow a first joint fastening member and a second joint fastening member to extend therethrough, and the PCB is loaded on the sealed surplus part of the battery cell in a state in which the PCB is received between the upper case and the lower case such that the PCB is electrically connected to the electrode terminals of the battery cell in a state in which the PCB is coupled to the electrode terminals of the battery cell by the first joint fastening member and the second joint fastening member.

In a general process of assembling an embedded type battery pack, a connection member and an F-PCB are coupled and an insulative tape is attached at each step such that a PCM assembly is mounted on a battery cell. Consequently, the PCM assembly is mounted to the battery cell using a large number of parts. As a result, a large number of processes are required. In addition, mechanical strength and structural stability of the battery pack are low.

On the other hand, the PCM according to the present invention is configured to have a structure in which the safety element is mounted in the module case in a state in which the safety element is coupled to the PCB. Consequently, structural stability of the battery pack is improved and a process of manufacturing the battery pack is greatly simplified.

In a concrete example, the first joint fastening member may extend through the first openings, the second joint fastening member may extend through the second openings, and the first openings and the second openings formed at the module case, the PCB, and the electrode terminals each may be aligned in a straight line such that the first joint fastening member and the second joint fastening member extend through the first openings and the second openings formed at the module case, the PCB, and the electrode terminals, respectively, in the straight line.

The first joint fastening member and the second joint fastening member each may be made of an electrically conductive material. In this case, bolt heads of the first joint fastening member and the second joint fastening member may function as external input and output terminals after the first joint fastening member and the second joint fastening member are fixed to the module case, the PCB, and the electrode terminals by bolting.

In addition, the first joint fastening member and the second joint fastening member each may be configured to have a bolt structure including a bolt head and a bolt body having a thread formed at an outside thereof for fixing the module case, the PCB, and the electrode terminals by bolting. Consequently, the first joint fastening member and the second joint fastening member with the above-stated construction may fix even a mount part of a device, in which the battery pack is mounted, by bolting, thereby achieving a stable mounting effect of the battery pack.

In accordance with another aspect of the present invention, there is provided a method of manufacturing the battery pack with the above-stated construction.

Specifically, the method of manufacturing the battery pack according to the present invention may include (a) mounting a PCB in a module case, (b) loading a PCM on a sealed surplus part of a battery cell, (c) assembling and fastening a first joint fastening member and a second joint fastening member into first openings and second openings, respectively, and (d) attaching a label to outer surfaces of the PCM and the battery cell in a wrapping fashion.

As compared with a method of manufacturing a conventional embedded type battery pack, it is possible for the battery pack manufacturing method according to the present invention to reduce the number of manufacturing processes and to provide a battery pack exhibiting improved structural stability.

In accordance with a further aspect of the present invention, there is provided a mobile device including the battery pack with the above-stated construction as a power source.

Concrete examples of the mobile device in which the battery pack according to the present invention can be used may include a mobile phone, a laptop computer, a netbook computer, a tablet PC, and a smart pad.

The above-described devices or apparatuses are well known in the art to which the present invention pertains and, therefore, a detailed description will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a battery pack according to an embodiment of the present invention;

FIG. 2 is an exploded perspective view of the battery pack shown in FIG. 1; and

FIGS. 3 to 6 are typical views showing a process of manufacturing a battery pack according to an embodiment of the present invention.

BEST MODE

Now, exemplary embodiments of the present invention will be described in detail with reference to the accompanying drawings. It should be noted, however, that the scope of the present invention is not limited by the illustrated embodiments.

FIG. 1 is a perspective view showing a battery pack according to an embodiment of the present invention and FIG. 2 is an exploded perspective view of the battery pack shown in FIG. 1.

Referring to these drawings, a battery pack 600 includes a plate-shaped battery cell 100 having electrode terminals 110 and 120 formed at one side thereof including a sealed surplus part 130, an electrically insulative module case 300 for receiving and fixing a protection circuit board (PCB) 200, and a first joint fastening member 410 and a second joint fastening member 420 for fixing the module case 300 to the sealed surplus part 130 of the battery cell 100. The plate-shaped battery cell 100 and the module case 300 are wrapped by a protection label 500.

Specifically, the module case 300 includes an upper case 310 and a lower case 320. The module case 300 is configured to have a structure in which the PCB 200 is received in an inner space defined between the upper case 310 and the lower case 320 as the upper case 310 and the lower case 320 are coupled to each other.

The battery cell 100 is provided at one side of the sealed surplus part 130 thereof with an opening, through which the electrode terminals 110 and 120 are exposed. The outermost ends of the electrode terminals 110 and 120 have a size corresponding to the outer circumference of the sealed surplus part 130.

However, the shape of the electrode terminals 110 and 120 of the battery cell 100 is not limited to the shape shown in FIG. 2. For example, the battery cell 100 may be a plate-shaped battery cell having electrode terminals extending outward from one side thereof including a sealed surplus part 130.

FIGS. 3 to 6 are typical views showing a process of manufacturing a battery pack according to an embodiment of the present invention.

Referring first to FIG. 3, a PCB 200 is received in an inner space defined between an upper case 310 and a lower case 320 as the upper case 310 and the lower case 320 are coupled to each other.

The PCB 200 has a first joint part 210 and a second joint part 220 formed on a circuit board. The first joint part 210 is provided with a first opening 211 and the second joint part 220 is provided with a second opening 212. In addition, the upper case 310 is provided with first openings 311 and 321 and the lower case 320 is provided with second openings 312 and 322.

Specifically, the first openings 311, 211, and 321 are aligned in a straight line and the second openings 312, 212, and 322 are aligned in a straight line (see dotted-line arrows).

In addition, the module case 300 is assembled through an assembly type fastening structure in which the upper case 310 and the lower case 320 are coupled to each other. The assembly type fastening structure includes fastening protrusions 323 formed at one side of the lower case 320 and fastening grooves 313 formed at the upper case 310 such that the fastening grooves 313 correspond to the fastening protrusions 323.

Referring to FIG. 4, the module case 300, in which the PCB 200 is received, is loaded on a sealed surplus part 130 of a battery cell 100.

Electrode terminals 110 and 120 formed at the sealed surplus part 130 of the battery cell 100 are provided with a first opening 111 and a second opening 121, respectively. The first opening 111 is aligned with the first opening 311 formed at the module case 300 and the second opening 121 is aligned with the second openings 312 formed at the module case 300 (see dotted lines).

Referring to FIG. 5, a first joint fastening member 410 and a second joint fastening member 420 are fastened through the first opening 311 and the second openings 312 by bolting.

The first joint fastening member 410 and the second joint fastening member 420 each are made of an electrically conductive material. The first joint fastening member 410 includes a bolt head 411 and a bolt body 412 having a thread formed at the outside thereof. In the same manner, the second joint fastening member 420 includes a bolt head 421 and a bolt body 422 having a thread formed at the outside thereof. The first joint fastening member 410 and the second joint fastening member 420 with the above-stated construction securely fix the module case 300, in which the PCB 200 is received, to the sealed surplus part 130 of the battery cell 100 and, at the same time, electrically connect the electrode terminals 110 and 120 of the battery cell 100 to the first joint part 210 and the second joint part 220 of the PCB 200, respectively.

According to circumstances, the bolt bodies 412 and 422 of the first joint fastening member 410 and the second joint fastening member 420 may be lengthened to fix even a mount part of a device (not shown), in which the battery pack 600 is mounted, by bolting.

Meanwhile, the height of the module case 300 loaded on the sealed surplus part 130 of the battery cell 100 may be substantially equal to the thickness of the battery cell 100.

The module case 300 with the above-stated construction is a rectangular hexahedral structure having a smooth outer surface. Consequently, the module case 300 may be easily loaded on the sealed surplus part 130 of the battery cell 100. In addition, the module case 300 forms a smooth outer surface of the battery pack 600. Consequently, it is possible to manufacture a battery pack which has correct dimensions and, at the same time, provides an aesthetically pleasing appearance.

Referring to FIG. 6, the outer surface of the battery cell 100 and the outer surface of the module case 300 are wrapped by a protection label 500 excluding the bolt heads 411 and 421 of the first joint fastening member 410 and the second joint fastening member 420.

The label 500, which indicates information of a product, more stably secures electrical connection between the electrode terminals 110 and 120 of the battery cell 110 and the PCB 200 while maintaining an insulation state of the battery cell 110.

In addition, tops of the bolt heads 411 and 421 of the first joint fastening member 410 and the second joint fastening member 420 fixed in the first opening 311 and the second openings 312 by bolting are exposed to the outside. The exposed bolt heads 411 and 421 function as external input and output terminals for electrically connecting the battery pack 600 to an external device (not shown).

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention is configured to have a structure in which a protection circuit module case including an upper case, a lower case, first openings, and second openings is applied to the battery pack. Consequently, it is possible to simplify a manufacturing process, to improve structural stability, to provide a battery pack having a compact structure, and to provide higher electric capacity than other different battery packs having the same standard.

The invention claimed is:

1. A battery pack configured to have a structure comprising a plate-shaped battery cell, which has an electrode assembly, configured to have a structure in which a separator is disposed between a cathode and an anode, received in a battery case together with an electrolyte in a sealed state and electrode terminals formed at one side thereof comprising a sealed surplus part, and a protection circuit module (PCM) mounted at the sealed surplus part, wherein
   each of the electrode terminals of the battery cell is made of a plate-shaped conductive member,
   the PCM comprises a protection circuit board (PCB), a safety element electrically connected between the electrode terminals formed at one side of the battery cell and the PCB or loaded on the PCB, and an electrically insulative module case for surrounding the PCB and the safety element,
   the module case comprises an upper case and a lower case coupled to each other through an assembly type fastening structure for receiving the PCB and the safety element,
   the module case, the PCB, and the electrode terminals are provided with first openings and second openings having a sufficient size to allow a first joint fastening member and a second joint fastening member to extend therethrough, and
   the PCB is loaded on the sealed surplus part of the battery cell in a state in which the PCB is received between the upper case and the lower case such that the PCB is electrically connected to the electrode terminals of the battery cell in a state in which the PCB is coupled to the electrode terminals of the battery cell by the first joint fastening member and the second joint fastening member.

2. The battery pack according to claim 1, wherein the sealed surplus part is an upper end sealed part formed when the battery case is thermally bonded in a sealed state.

3. The battery pack according to claim 1, wherein the plate-shaped battery cell is provided at one side or opposite sides of the sealed surplus part thereof with an opening, through which the electrode terminals are exposed.

4. The battery pack according to claim 3, wherein outermost ends of the electrode terminals have a size corresponding to an outer circumference of the sealed surplus part.

5. The battery pack according to claim 3, wherein the opening is formed by cutting the sealed surplus part.

6. The battery pack according to claim 1, wherein the plate-shaped battery cell is configured to have a structure in which the electrode terminals extend outward from one side thereof comprising the sealed surplus part.

7. The battery pack according to claim 1, wherein the plate-shaped battery cell is a pouch-shaped secondary battery having an electrode assembly received in a battery case made of a laminate sheet comprising a resin layer and a metal layer in a sealed state.

8. The battery pack according to claim 1, wherein the safety element comprises at least one selected from a group consisting of a positive temperature coefficient (PTC) element, a fuse, and a thermal cutoff or cutout (TCO).

9. The battery pack according to claim 1, wherein the assembly type fastening structure comprises two or more fastening protrusions formed at one side of the lower case and two or more fastening grooves formed at the upper case in a state in which each of the fastening grooves has a structure corresponding to a structure of a corresponding one of the fastening protrusions.

10. The battery pack according to claim 1, wherein the first joint fastening member extends through the first openings, the second joint fastening member extends through the second openings, and the first openings and the second openings formed at the module case, the PCB, and the electrode terminals each are aligned in a straight line such that the first joint fastening member and the second joint fastening member extend through the first openings and the second openings formed at the module case, the PCB, and the electrode terminals, respectively, in the straight line.

11. The battery pack according to claim 1, wherein the first joint fastening member and the second joint fastening member each are made of an electrically conductive material.

12. The battery pack according to claim 11, wherein the first joint fastening member and the second joint fastening member each are configured to have a bolt structure comprising a bolt head and a bolt body having a thread formed at an outside thereof and the bolt heads of the first joint fastening member and the second joint fastening member function as external input and output terminals after the first joint fastening member and the second joint fastening member are fixed to the module case, the PCB, and the electrode terminals by bolting.

13. The battery pack according to claim 12, wherein the first joint fastening member and the second joint fastening member fix even a mount part of a device, in which the battery pack is mounted, by bolting.

14. The battery pack according to claim 1, further comprising a label attached to outer surfaces of the PCM and the battery cell excluding external input and output terminals in a wrapping fashion.

15. A protection circuit module (PCM) loaded on a sealed surplus part of a plate-shaped battery cell having an electrode assembly, configured to have a structure in which a separator is disposed between a cathode and an anode, received in a battery case together with an electrolyte in a sealed state, wherein
the PCM comprises a PCB, a safety element electrically connected between electrode terminals formed at one side of the battery cell and the PCB or loaded on the PCB, and an electrically insulative module case for surrounding the PCB and the safety element,
the module case comprises an upper case and a lower case coupled to each other through an assembly type fastening structure for receiving the PCB and the safety element,
the module case, the PCB, and the electrode terminals are provided with first openings and second openings having a sufficient size to allow a first joint fastening member and a second joint fastening member to extend therethrough, and
the PCB is loaded on the sealed surplus part of the battery cell in a state in which the PCB is received between the upper case and the lower case such that the PCB is electrically connected to the electrode terminals of the battery cell in a state in which the PCB is coupled to the electrode terminals of the battery cell by the first joint fastening member and the second joint fastening member.

16. The PCM according to claim 15, wherein the first joint fastening member extends through the first openings, the second joint fastening member extends through the second openings, and the first openings and the second openings formed at the module case, the PCB, and the electrode terminals each are aligned in a straight line such that the first joint fastening member and the second joint fastening member extend through the first openings and the second openings formed at the module case, the PCB, and the electrode terminals, respectively, in the straight line.

17. The PCM according to claim 15, wherein the first joint fastening member and the second joint fastening member each are made of an electrically conductive material.

18. The PCM according to claim 17, wherein the first joint fastening member and the second joint fastening member each are configured to have a bolt structure comprising a bolt head and a bolt body having a thread formed at an outside thereof and the bolt heads of the first joint fastening member and the second joint fastening member function as external input and output terminals after the first joint fastening member and the second joint fastening member are fixed to the module case, the PCB, and the electrode terminals by bolting.

19. The PCM according to claim 18, wherein the first joint fastening member and the second joint fastening member fix even a mount part of a device, in which a battery pack is mounted, by bolting.

20. A method of manufacturing a battery pack according to claim 1, the method comprising:
(a) mounting a PCB in a module case;
(b) loading a PCM on a sealed surplus part of a battery cell;
(c) assembling and fastening a first joint fastening member and a second joint fastening member into first openings and second openings, respectively; and
(d) attaching a label to outer surfaces of the PCM and the battery cell in a wrapping fashion.

21. A mobile device comprising a battery pack according to claim 1 as a power source.

22. The mobile device according to claim 21, wherein the mobile device is a mobile phone, a laptop computer, a netbook computer, a tablet PC, or a smart pad.

* * * * *